United States Patent
Klein et al.

(10) Patent No.: US 10,532,620 B1
(45) Date of Patent: Jan. 14, 2020

(54) MECHANISM AND SUSPENSION TO IMPROVE STABILITY AND HANDLING FOR KNUCKLE-BOOM LOADER TRAILERS IN OFF-ROAD CONDITIONS

(71) Applicants: Jason M. Klein, Nixa, MO (US); Jeff B. Pitts, Pittsview, AL (US)

(72) Inventors: Jason M. Klein, Nixa, MO (US); Jeff B. Pitts, Pittsview, AL (US)

( * ) Notice: Subject to any disclaimer, the term of this patent is extended or adjusted under 35 U.S.C. 154(b) by 0 days.

(21) Appl. No.: 16/182,824

(22) Filed: Nov. 7, 2018

Related U.S. Application Data (63) Continuation of application No. 15/269,103, filed on Sep. 19, 2016, now abandoned.

(60) Provisional application No. 62/284,025, filed on Sep. 18, 2015.

(51) Int. Cl.
B60G 5/06 (2006.01)

(52) U.S. Cl.
CPC ........ B60G 5/065 (2013.01); *B60G 2200/318* (2013.01); *B60G 2200/322* (2013.01); *B60G 2300/06* (2013.01); *B60Y 2410/124* (2013.01)

(58) Field of Classification Search
CPC ........ B60G 2200/318; B60G 2200/322; B60G 5/00
See application file for complete search history.

(56) References Cited

U.S. PATENT DOCUMENTS

| | | | | |
|---|---|---|---|---|
| 2,398,248 | A | 4/1946 | Reid | B60G 5/01 |
| 2,493,023 | A | 1/1950 | Pointer | B60G 5/04 |
| 2,951,710 | A * | 9/1960 | Willetts | B60G 5/06 |
| | | | | 267/276 |
| 3,099,459 | A | 7/1963 | Zalar | B60G 5/03 |
| 3,298,706 | A | 1/1967 | Lyall | B62D 53/068 |
| 3,338,426 | A | 8/1967 | Grove | B66C 23/80 |
| 3,471,165 | A | 10/1969 | Raidel | B60G 5/04 |
| 3,770,072 | A | 11/1973 | Cheney | B60G 5/04 |
| 4,184,698 | A | 1/1980 | Raidel | B60G 5/04 |
| 4,331,348 | A | 5/1982 | Raidel | B60G 7/00 |
| 4,350,190 | A * | 9/1982 | McColl | A01G 23/006 |
| | | | | 144/4.1 |
| 4,938,643 | A * | 7/1990 | Lamb | B61D 3/182 |
| | | | | 104/44 |
| 4,968,055 | A | 11/1990 | Reilly | B60G 5/02 |
| 6,118,083 | A * | 9/2000 | Boyovich | G01G 19/12 |
| | | | | 177/136 |
| 6,659,503 | B2 | 12/2003 | Damron | B62D 21/14 |
| 7,341,272 | B2 * | 3/2008 | Neal | B60G 5/02 |
| | | | | 280/124.116 |
| 2006/0208463 | A1 | 9/2006 | Neal | B60G 5/02 |

* cited by examiner

*Primary Examiner* — James A English
(74) *Attorney, Agent, or Firm* — Jonathan A. Bay (57) ABSTRACT

A knuckle-boom loader trailer has a trailer frame, a heavy equipment package of a knuckle-boom crane and an operator cab mounted on top of the trailer frame, and a walking-beam suspension propping up the trailer frame.

6 Claims, 9 Drawing Sheets

MECHANISM AND SUSPENSION TO IMPROVE STABILITY AND HANDLING FOR KNUCKLE-BOOM LOADER TRAILERS IN OFF-ROAD CONDITIONS

CROSS-REFERENCE TO PROVISIONAL APPLICATION(S)

This application is a continuation of U.S. patent application Ser. No. 15/269,103, filed Sep. 19, 2016, which claims the benefit of U.S. Provisional Application No. 62/284,025, filed Sep. 18, 2015. The foregoing patent disclosures are incorporated herein by this reference thereto.

BACKGROUND AND SUMMARY OF THE INVENTION

The invention relates to heavy trailer suspensions and, more particularly, to a mechanism and suspension to improve the stability and handling performance for knuckle-boom loader trailers in off-road conditions.

Nowadays, conventional configurations of knuckle-boom loader trailers have a simple frame trailer with not only a relatively rudimentary and inexpensive suspension, but also—and in sharp contrast, with an expensive, heavy and tall knuckle-boom crane and operator cab mounted thereon. While the knuckle-boom crane and operator cab will probably only towed with the crane lowered, the height of the operator cab and lowered nevertheless present a relatively high center of gravity.

These current day, conventional configurations for a knuckle-boom loader trailer offer sparse axle-suspension options, namely, just two.

(1) The simplest option is where the axles are welded directly to the frame. However, this offers no travel-shock dampening, which thus can cause equipment damage when transporting the trailer from job-site to job-site; and (2) An alternative and slightly improved option is a single-point suspension that rigidly attaches to a tandem axle set. This will offer suspension articulation front to back. But, single-point suspensions are limited to how sizable of bump obstacles that the suspension and trailer can (versus cannot) overcome.

Both those kinds of suspensions for knuckle-boom loader trailers are further known as being difficult to maneuver in the off-road conditions where these trailers are put to use in logging environments. In southern logging fields, the soil is typically sandy and/or clay. The soil is furthermore rutted to deeply rutted by previous logging vehicle traffic. Tree limb and tree trunk parts litter the field everywhere, as well as stumps.

The knuckle-boom loader is typically the product of one manufacturer, while the trailer is typically the product of another. For example, "DEERE" ® is one typical example of a knuckle-boom loader manufacturer. "PITTS TRAILERS" ® is a typical example of a manufacturer of a trailer therefor. When a knuckle-boom loader is affixed on a trailer, this a permanent mounting, and results in a knuckle-boom loader trailer.

Knuckle-boom loader trailers might be towed over-the-road once during its use life, and that is from the dealer to the where the logging roads begin where the logging fields are. After that one-way trip from the dealer, knuckle-boom loader trailers are towed by heavy tractors, at very low speeds (ie., at a crawl at times, just a couple to a few miles per hour).

The knuckle-boom loader is an expensive piece of equipment (eg., hundreds of thousands of dollars), a heavy piece of equipment (eg., in excess of 50,000 lbs.), and therefore the tow speed is very slow.

It is an object of the invention to produce a suspension design which is more easily maneuverable in the field and would also be safer, have time saving benefits when transported, and can save potential costly losses by reducing if not eliminating costly equipment damage due to trailer rollover.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
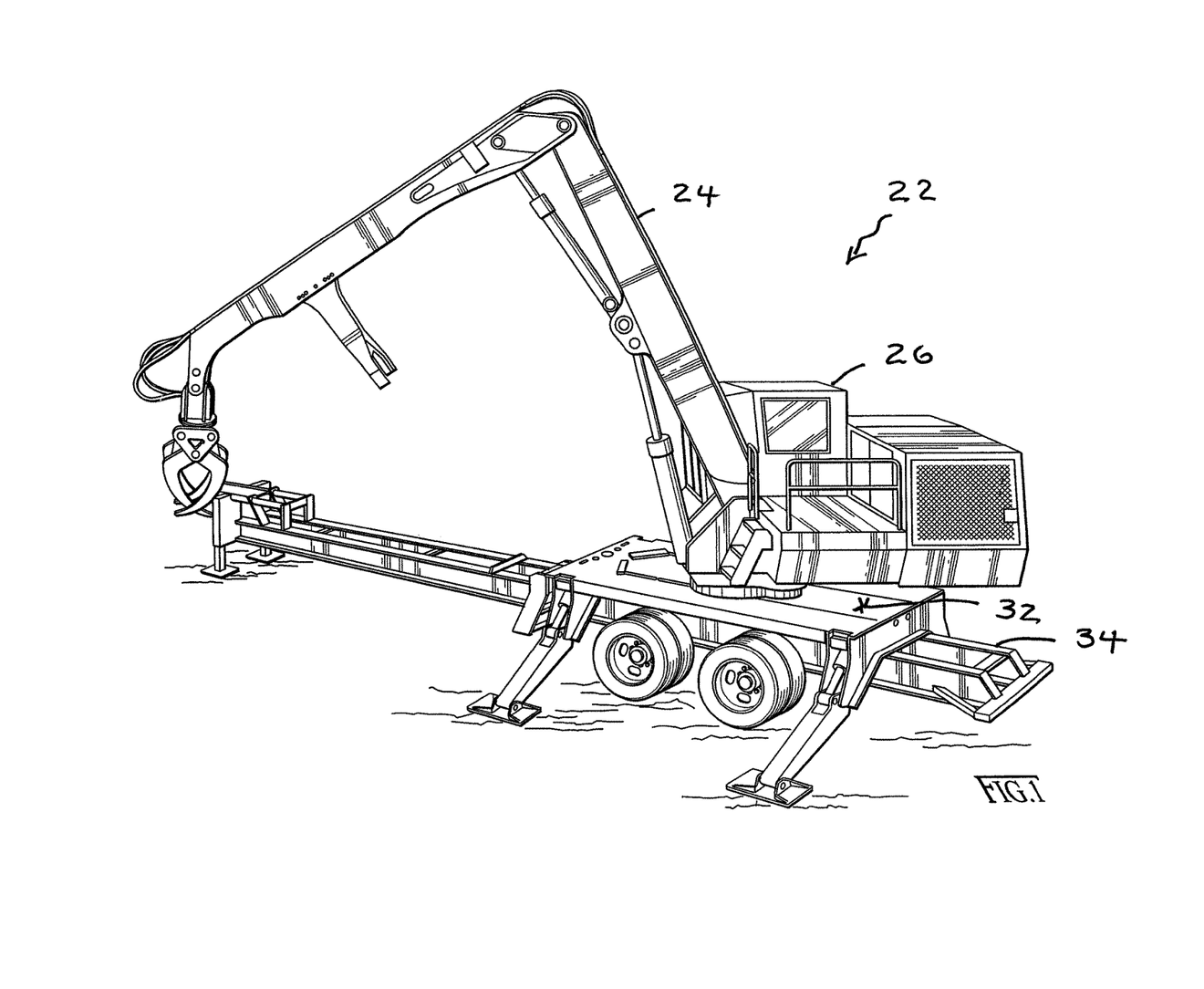
FIG. 1 is a perspective view a knuckle-boom loader trailer provided with a mechanism and suspension in accordance with the invention to improve stability and handling for such knuckle-boom loader, trailers in off-road conditions.
Figure 2:
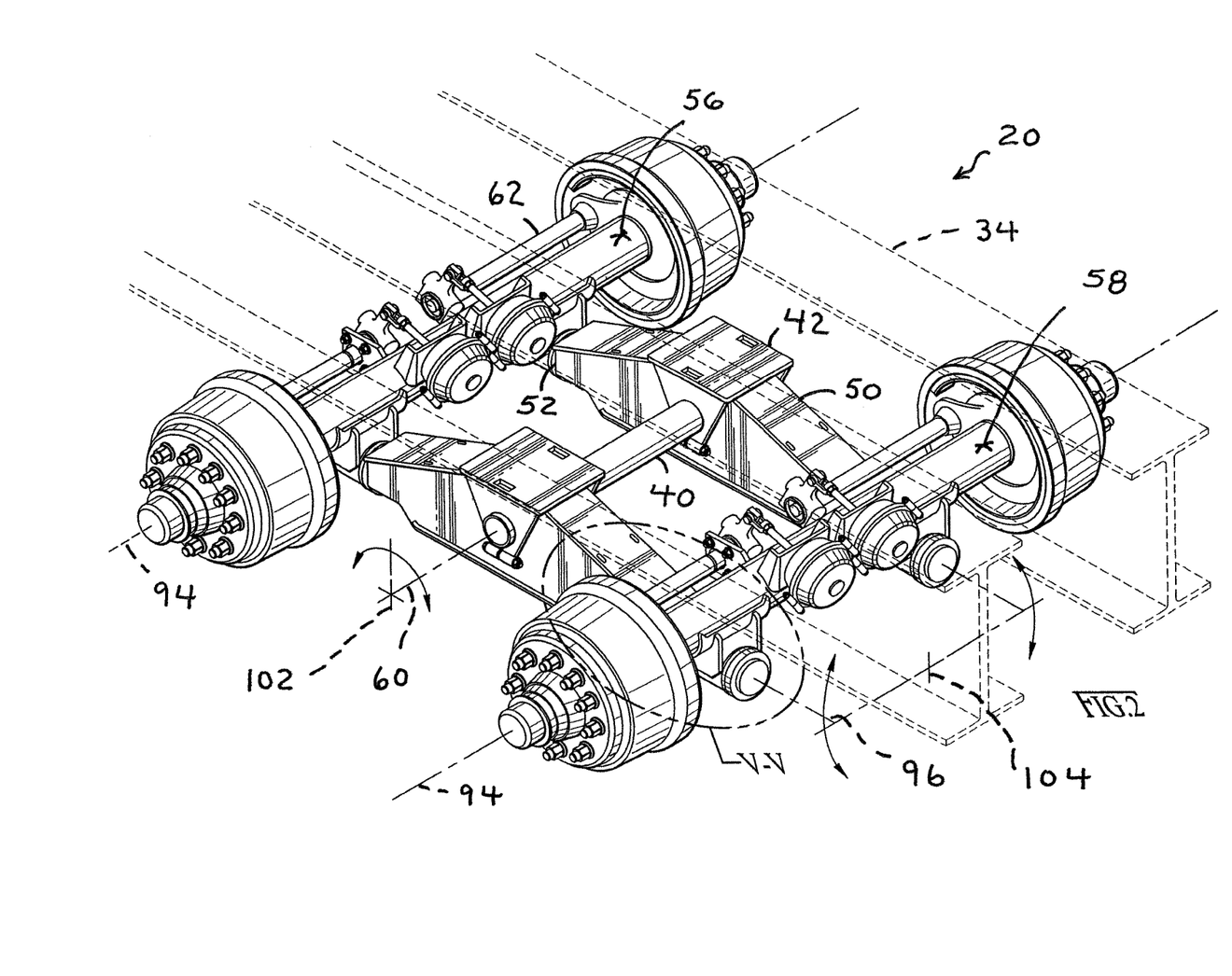
FIG. 2 is an enlarged-scale perspective view of a preferred embodiment of a suspension therefor and in accordance with the invention.

FIG. 2 shows a suspension 20 in accordance for the invention for a knuckle-boom loader trailer 22, which is likewise in accordance with the invention, and which is shown in FIG. 1. The knuckle-boom loader trailer 22 comprises a package of a knuckle-boom crane 24 and an operator cab 26, which package of knuckle-boom crane 24 and operator cab 26 are mounted on a deck 32 of the trailer frame 34.

Figure 3:
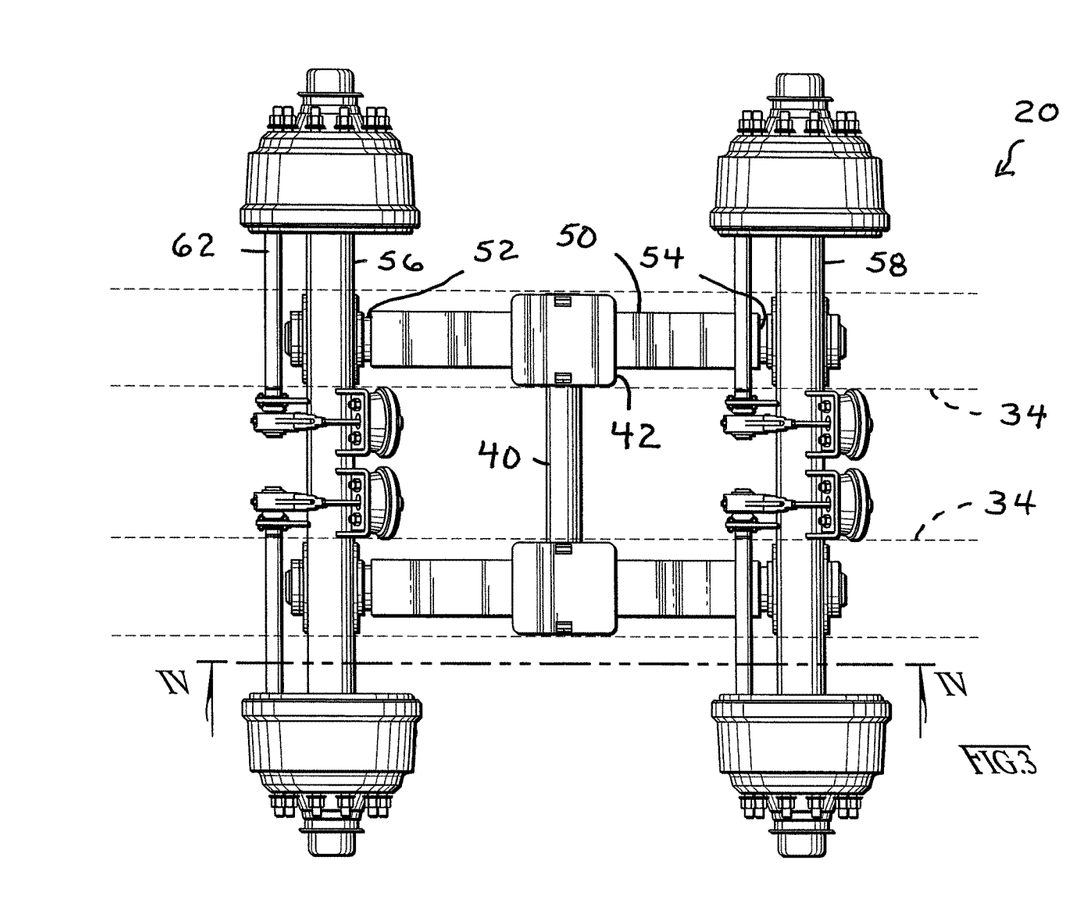
FIG. 3 is a top plan view of FIG. 2.
Figure 4:
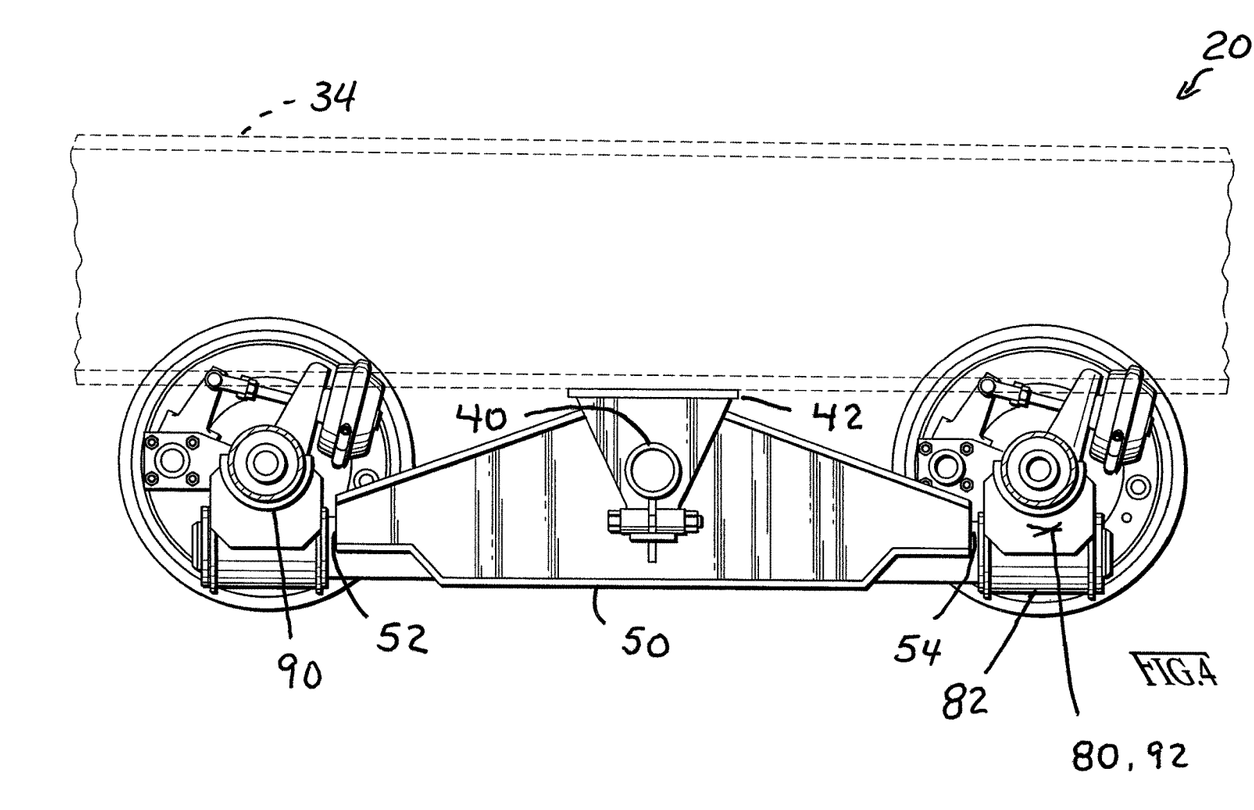
FIG. 4 is a side elevational view, partly in section, taken in the direction of arrows IV-IV in FIG. 3.

To turn to FIGS. 2 through 4, the suspension 20 comprises central trunnion tube 40 hung under the trailer frame 34 by a laterally-spaced pair of a left and a right trunnion hub-and-clamp fixture 42. The configuration in part of these fixtures 42 can be referred to as a straddle-mount configuration. The trunnion tube 40 is clamped or otherwise affixed tight such that the trunnion tube 40 does not rotate relative to the laterally-spaced pair trunnion hub-and-clamp fixtures 42 (or the trailer frame 34 for that matter). The trunnion hub-and-clamp fixtures 42 are fastened, welded or otherwise affixed to the trailer frame 34.

Each of the laterally-spaced left and trunnion hub-and-clamp fixture 42 carries a longitudinally-elongated, left and right walking beam 50 respectively. The walking beams 50 extend between front ends 52 and rear ends 54, wherein the front ends 52 carry a front axle 56 and the rear ends 54 carry a rear axle 58, whereby the axles 56 and 58 are carried in a tandem arrangement.

Each left and right walking beam 50 has a central mounting aperture (not shown) through which preferably a respective left and right resilient bushing (also not shown) is inserted therethrough. The trunnion tube 40 is inserted through these resilient bushings of the left and right walking beams 50 (again, these resilient bushings are not shown).

The trunnion tube 40 defines a laterally-extending oscillation axis 60. From the vantage point of FIG. 2, the walking beams 50 can oscillate reversibly between clockwise (front axle 56 rises, rear axle 58 drops) and counterclockwise (front axle 56 drops, rear axle 58 rises) extremes. Moreover, the left and right-side walking beams 50 can oscillate clockwise and counterclockwise independently of each other.

FIGS. 2 through 4 furthermore show slack adjuster provisions 62 for compensating for brake shoe wear. These are shown as a matter of design environment.

Figure 5:
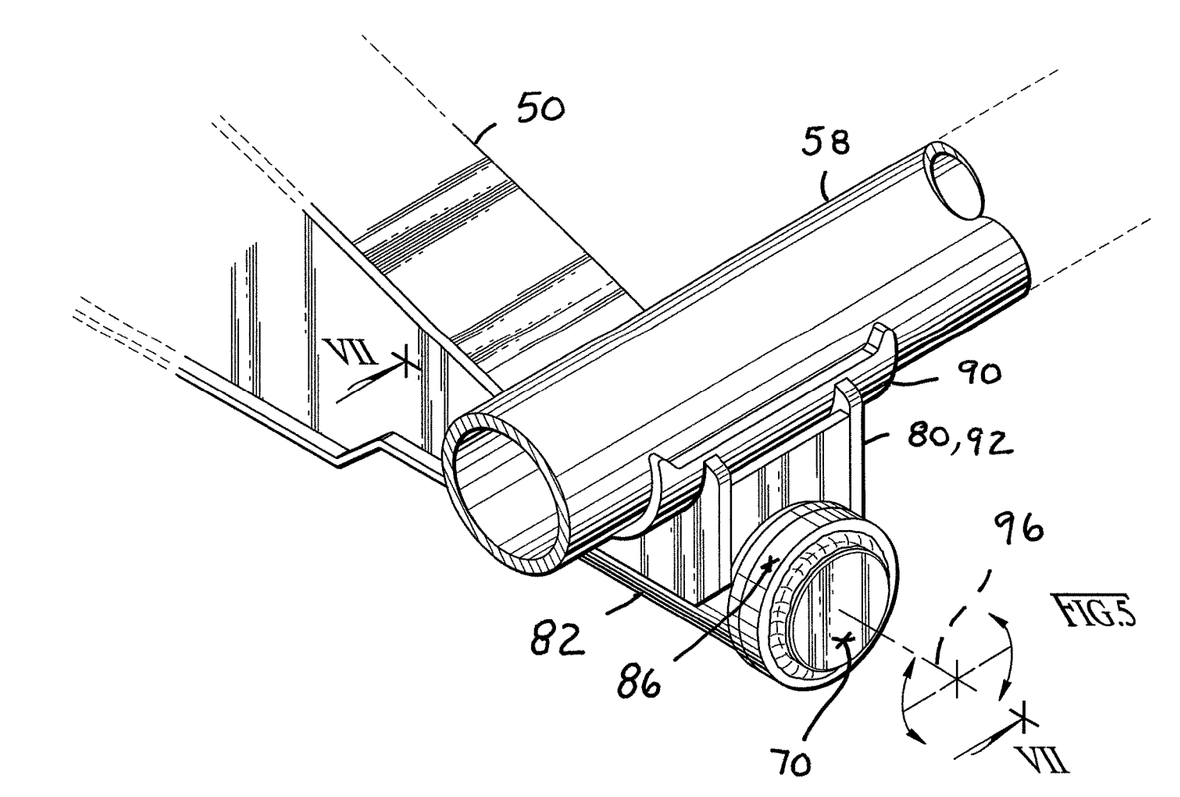
FIG. 5 is an enlarged scale perspective view of detail V-V in FIG. 2.
Figure 6:
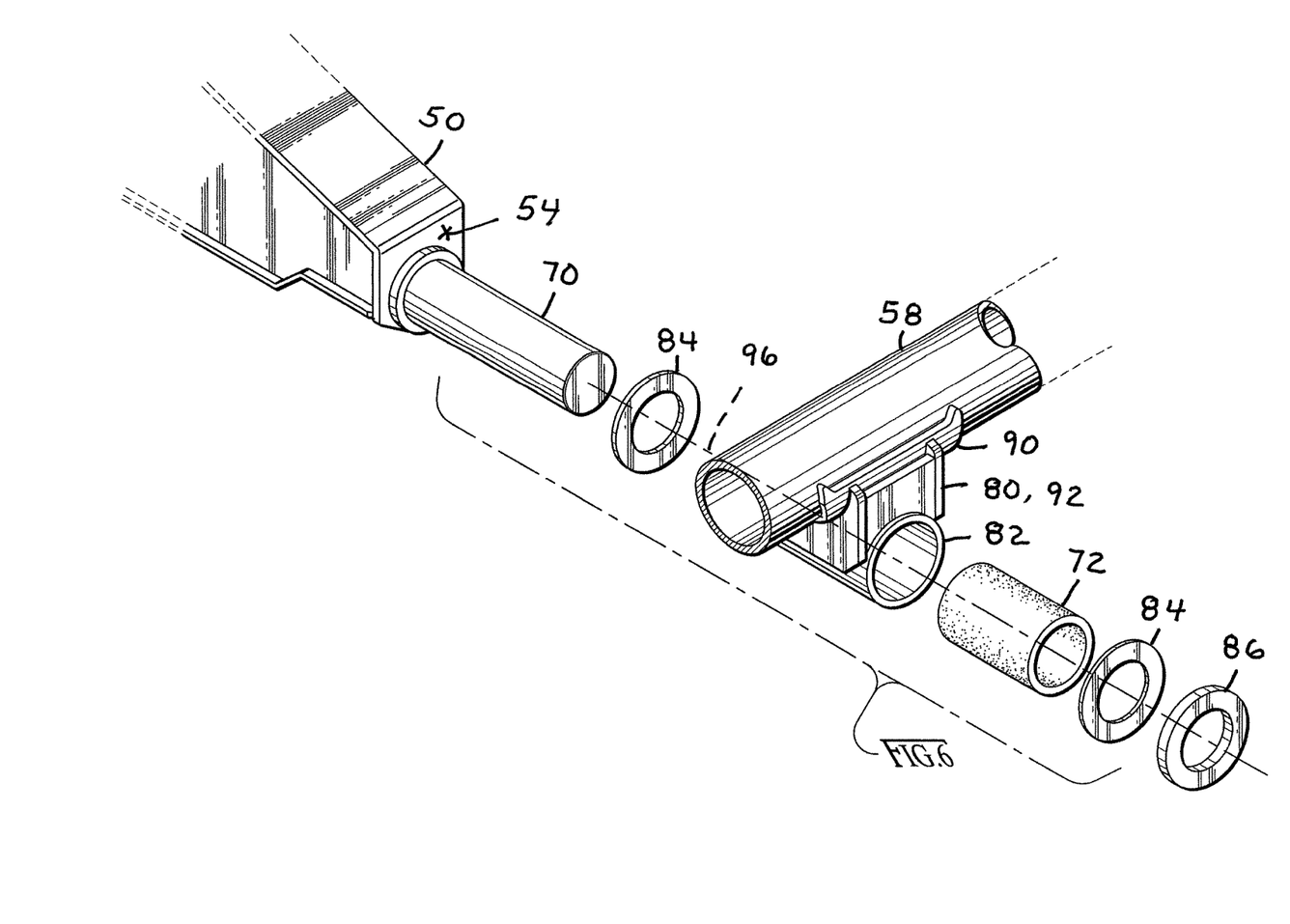
FIG. 6 is an exploded perspective view of FIG. 5.
Figure 7:
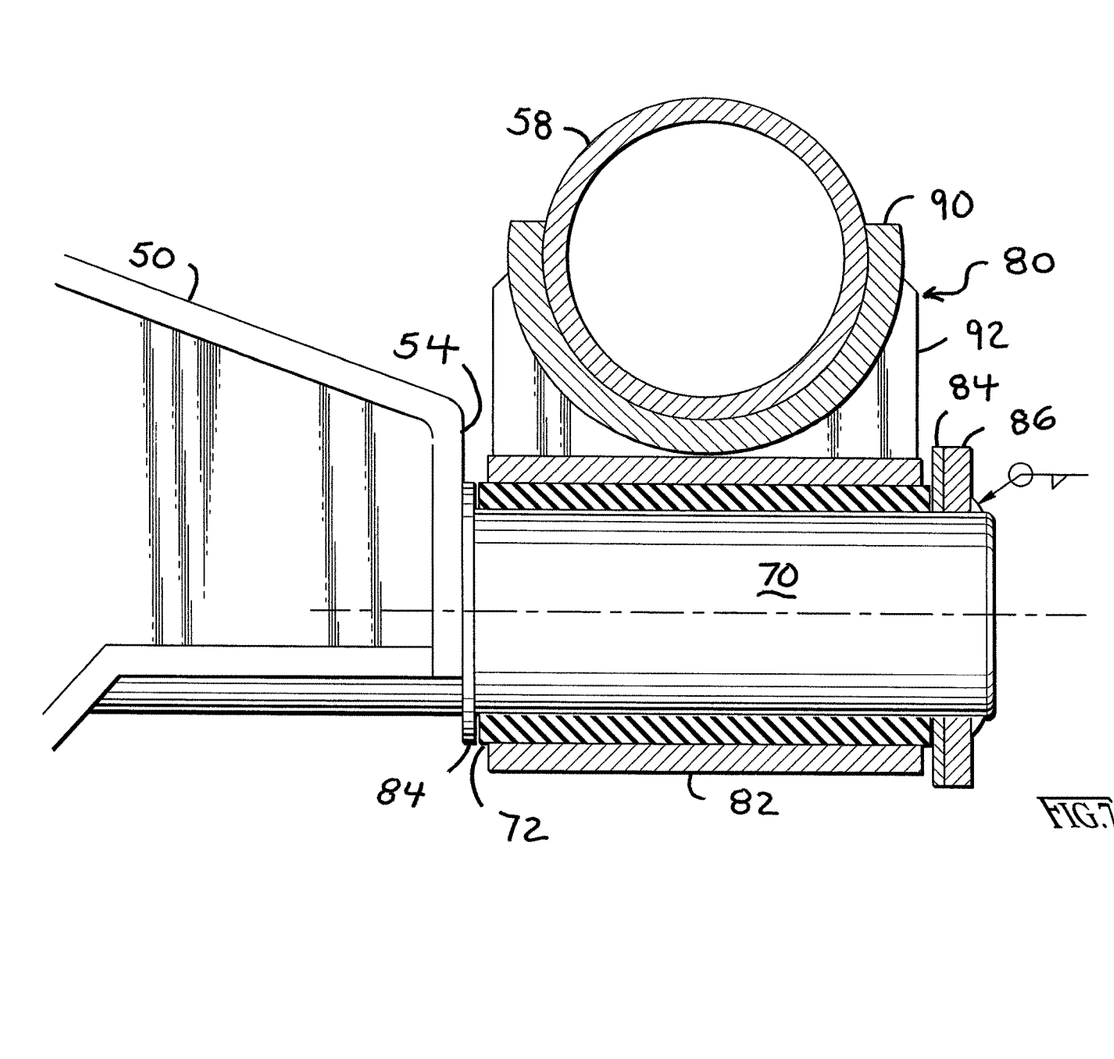
FIG. 7 is a sectional view taken along the offset cutting line VII-VII in FIG. 5.

FIGS. 5 through 7 show better the rear end 54 of the left-side walking beam 50, as representative of all four ends 52 and 54 of the two walking beams 50. It is preferred if the walking beams 50 are symmetric about a vertical plane of symmetry containing the oscillation axis 60 when the walking beams 50 are level as shown in FIG. 2.

Returning to FIGS. 5 through 7, projecting out and forming the very terminal end of the walking beam 50 is a cylindrical arbor 70. Preferably the cylindrical arbor is solid. FIG. 6 shows better that a cylindrical hollow resilient bushing 72 is assembled surrounding the cylindrical sidewall of the arbor 70. A rocking cradle 80 has a cylindrical tubular arbor-revolving sleeve 82 that is assembled surrounding the resilient bushing 72. A pair of plain washers 84 flank the bushing 72 and the cylindrical tubular arbor-revolving sleeve 82 of the rocking cradle 80. A locking retainer 86 holds the bushing 72 and rocking cradle 80 from dislodging axially off the end of the arbor 70. As FIG. 7 shows, the locking retainer 86 can comprise and without limitation a heavy plate washer welded at about the terminal end of the arbor 70.

The rocking cradle 80 comprises not only the cylindrical tubular arbor-revolving sleeve 82 but also a semi-cylindrical axle saddle 90 in which a respective portion of a front or rear axle 56 or 58 is seated therein, and then welded along front and back weld seams. The rocking cradle 80 further comprises a welded-up box-Y saddle housing 92 for uniting and affixing together the cylindrical tubular arbor-revolving sleeve 82 with the semi-cylindrical axle saddle 90.

Preferably the suspension 20 as a whole (other than the resilient bushings 72 and portions of the slack adjuster provisions 62) is constructed of heavy-gauge or solid steel or aluminum stock which lends itself to welding. Popular materials for producing the resilient bushings 72 include without limitation polyurethane and/or natural rubber.

In FIG. 2, each axle 56 and 58 defines a laterally-extending axis 94 that (in FIG. 2) is parallel to the oscillation axis 60. Each of the four arbors 70 defines a respective, longitudinally-extending rocking axis 96 (only the rear rocking axes 96 are shown in FIG. 2) that are all perpendicular to the axle axes 94. The cross-hair symbol 102 that is perpendicular to the laterally-extending axle axes 94 and oscillation axis 60 is contained in a longitudinally-extending plane. The cross-hair symbol 104 that is perpendicular to the longitudinally-extending rocking axis 96 is contained in a laterally-extending plane.

To return to FIG. 5, the rocking cradle 80 can rock reversibly between clockwise and counterclockwise extremes about the respective arbor 70 (and in consequence, about the respective rocking axis 96).

Figure 8:
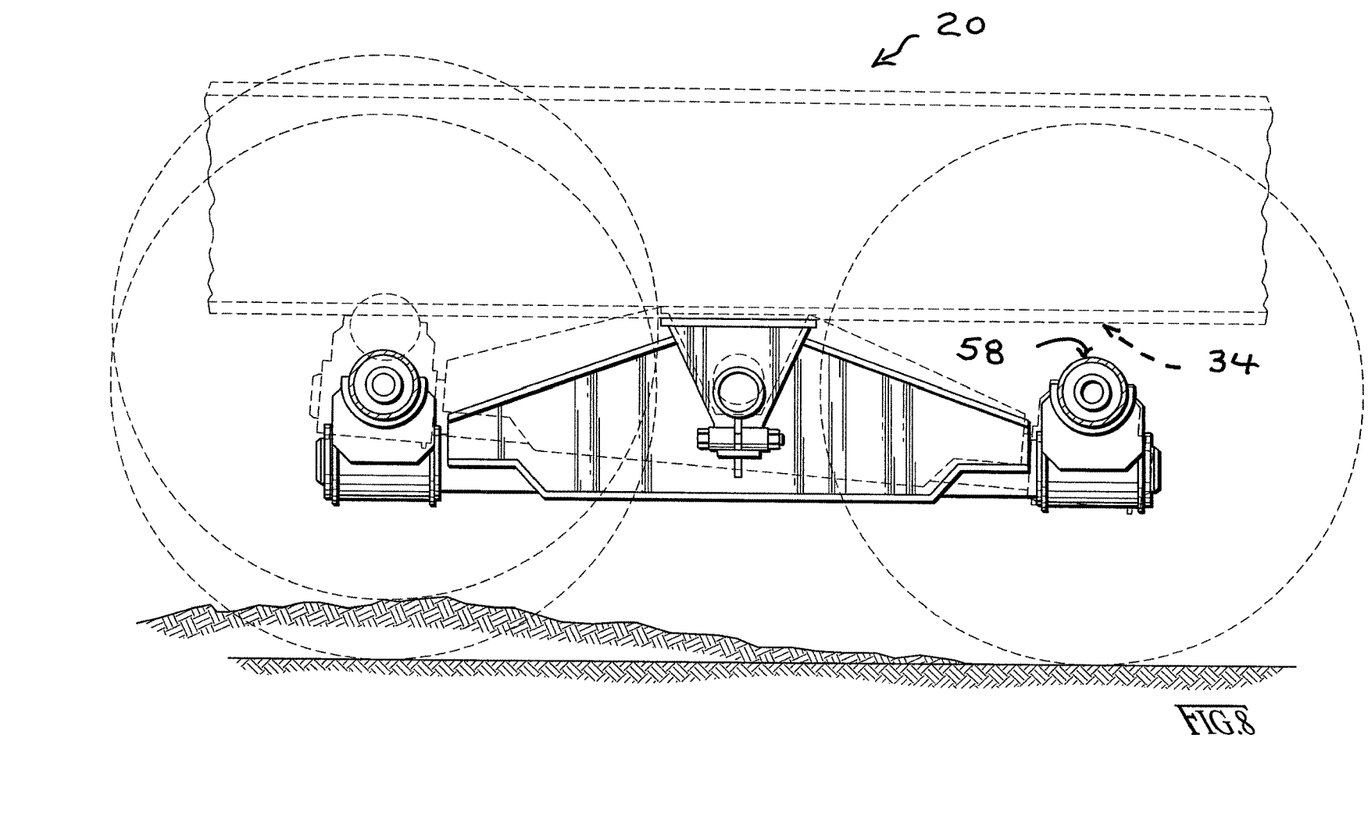
FIG. 8 is a side elevational view comparable to FIG. 4 except showing the rise of the left-side front axle as the left-side front tire climbs over a ground rise.
Figure 9:
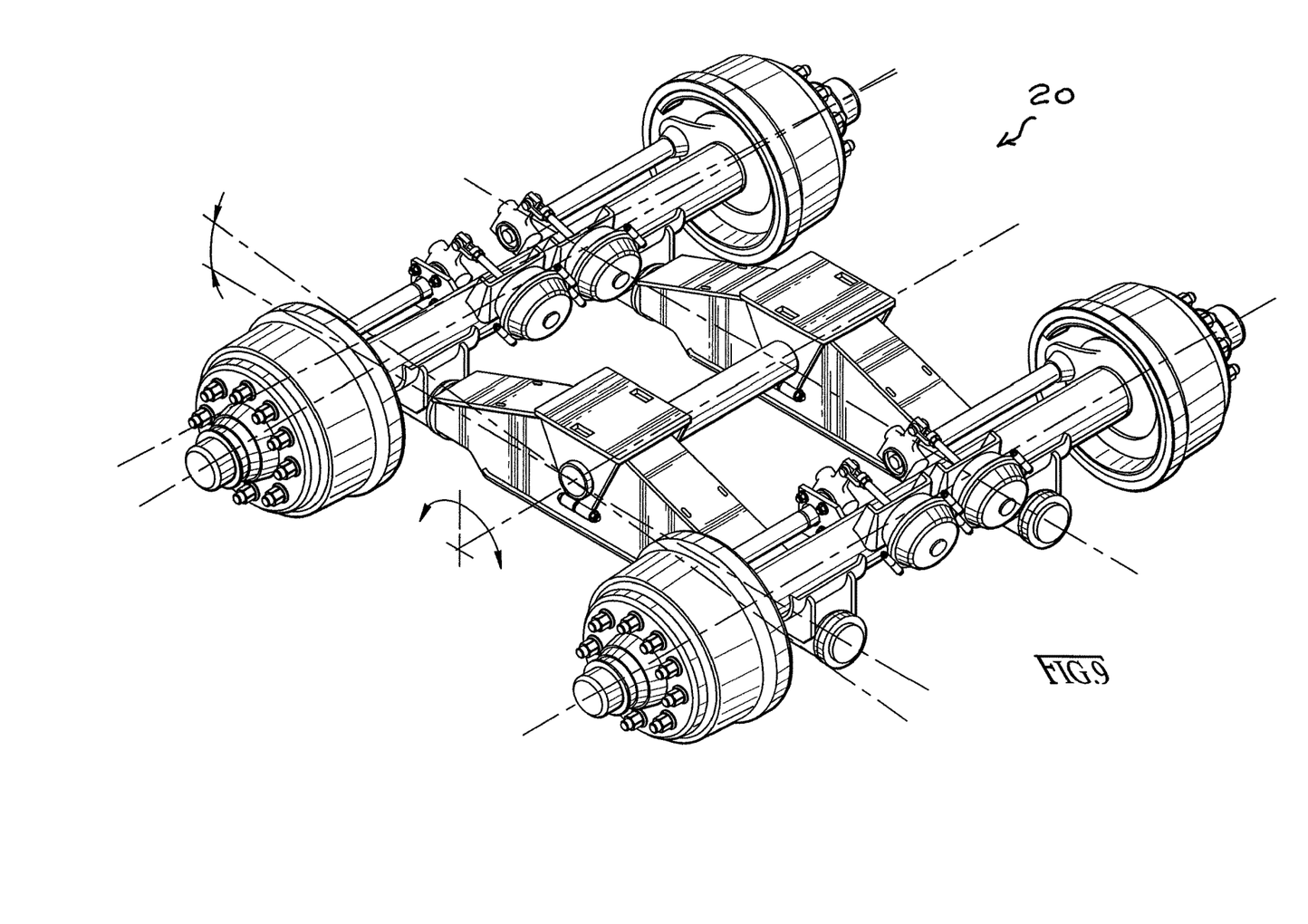
FIG. 9 is a perspective view comparable to FIG. 2 except showing the suspension distorted as shown in the condition of FIG. 8.

FIGS. 8 and 9 provide an exemplary illustration and without limitation of the kind of 'walking' motion that can be obtained by this suspension 20 in accordance with the invention for the a knuckle-boom loader trailer 22, likewise in accordance with the invention.

It is preferred if the suspension 20 has such an arrangement wherein the trunnion tube 40 is 'overslung' and the axles 56 and 58 are 'underslung." This arrangement gets the trailer 32 and trailer frame 34 lower to the ground the relatively high elevations of the tops of the lowered knuckle-boom crane 34 and operator cab 26, as well as their relatively high center of gravities.

It is preferred if the axles 56 and 58 are secured to the cradle 80 by weld seams (see, eg., FIG. 7) rather than U-bolts or other fasteners (not shown). The weld seams offer lower maintenance than U-bolts or other fasteners.

It is preferred if the axles 56 and 58 are welded to axle saddles 90 which are semi-cylindrical and have the upper halves removed. That way, when a walking beam 50 hits its top end extreme in either the clockwise or counterclockwise extreme, the effective stop is the direct contact between the top of the respective axle tube 56 or 58 and the bottom of the trailer frame 34. That way, without U-bolts (not shown) or a full-sleeve axle saddle (also not shown), a little more is gained for the maximum extreme oscillations for the walking beams 50 about the oscillation axis 60.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A knuckle-boom loader trailer comprising:
 a longitudinally-extending trailer frame;
 a heavy equipment package comprising a knuckle-boom crane and an operator cab mounted on top of the trailer frame;
 a walking-beam suspension propping up the trailer frame comprising a laterally-extending trunnion; left and right laterally-spaced trunnion hub-and-clamp fixtures; left and right longitudinally-elongated walking beams, the left walking beam being suspended for oscillation about a laterally-extending rocking axis from the left trunnion hub-and-clamp fixture and the right walking beam being suspended for independent oscillation about the laterally-extending rocking axis from the right trunnion hub-and-clamp fixture;
 said left and right trunnion hub-and-clamp fixtures cooperatively defining the laterally-extending rocking axis such that the left and right walking beams can oscillate reversibly between clockwise and counterclockwise extremes in generally laterally-extending planes independently from each other;
 each walking beam extending between a front end terminating in a longitudinally-extending arbor and a rear end terminating in a longitudinally-extending arbor, each arbor defining a longitudinally-extending pivot axis.

2. The knuckle-boom loader trailer of claim 1, wherein: the walking-beam suspension comprises an under-slung axles arrangement.

3. The knuckle-boom loader trailer of claim 1, wherein the suspension further comprises:
   four rocking cradles, one for each arbor of the front and rear ends of the left and right walking beams;
   each rocking cradle comprising an arbor-pivoting sleeve portion for surrounding the respective arbor and for pivoting about the respective generally longitudinally-extending pivot axis thereof between clockwise and counterclockwise extremes in generally laterally-extending planes.

4. The knuckle-boom loader trailer of claim 3, wherein the suspension further comprises:
   a laterally-extending front axle in front of the trunnion and a spaced laterally extending rear axle rear of the trunnion;
   left and right, front and rear axle saddle for affixing to left and right laterally-spaced positions on the front and rear axles respectively; and
   a respective housing for each arbor-pivoting sleeve for mating the respective arbor-pivoting sleeve with the respective axle saddle.

5. A knuckle-boom loader trailer comprising:
   a longitudinally-extending trailer frame;
   a heavy equipment package comprising a knuckle-boom crane and an operator cab mounted on top of the trailer frame; and
   a walking-beam suspension propping up the trailer frame comprising a laterally-extending trunnion as well as a front axle, a rear axle, and trunnion mounts suspending for oscillation about a laterally-extending rocking axis a laterally-spaced pair of left and right, longitudinally elongated rocking beams about a relative center of geometry for the rocking beams;
   the rocking beams longitudinally extending between respective front and rear ends, wherein the front ends of the left and right rocking beams mate with the front axle at respective laterally-spaced left and right positions, and, the rear ends of the left and right rocking beams mate with the rear axle at respective laterally-spaced left and right positions;
   the walking beam suspension further comprising four semi-cylindrical axle saddles mated respectively to one of the left and right, front and rear ends of the left and right rocking beams;
   wherein the rocking beams are arranged with respect to the trunnion to rock about the laterally-extending rocking axis between clockwise and counterclockwise extremes in generally longitudinally-extending planes and the axle saddles are arranged with respect to the ends of the rocking beams to pivot about generally longitudinally-extending pivot axes between clockwise and counterclockwise extremes in generally laterally-extending planes.

6. A trailer adaptable for a heavy equipment package, said trailer comprising:
   a longitudinally-extending trailer frame;
   a heavy equipment package mounted on top of the trailer frame; and
   a walking-beam suspension propping up the trailer frame comprising a laterally-extending trunnion, flanking longitudinally-spaced laterally-extending front and rear axles, and longitudinally-extending laterally-spaced left and right rocking beams interconnecting the axles and trunnion on respective laterally-spaced left and right positions thereon and each rocking beam extending longitudinally between spaced ends;
   wherein the rocking beams are arranged with respect to the trunnion to rock about a laterally-extending rocking axis between clockwise and counterclockwise extremes in generally longitudinally-extending planes; and
   the axles are arranged with respect to the ends of the walking beams to pivot about generally longitudinally-extending pivot axes between clockwise and counterclockwise extremes in generally laterally-extending planes.

* * * * *